United States Patent
Slutter et al.

(10) Patent No.: US 7,265,827 B2
(45) Date of Patent: *Sep. 4, 2007

(54) DOUBLE GRATING THREE DIMENSIONAL SPECTROGRAPH WITH MULTI-DIRECTIONAL DIFFRACTION

(75) Inventors: Warren Slutter, Lebanon, NJ (US); Jian Ming Xiao, Freemont, CA (US)

(73) Assignee: Horiba Jobin Yvon, Inc., Edison, NJ (US)

( * ) Notice: Subject to any disclaimer, the term of this patent is extended or adjusted under 35 U.S.C. 154(b) by 458 days.

This patent is subject to a terminal disclaimer.

(21) Appl. No.: 10/833,201

(22) Filed: Apr. 27, 2004

(65) Prior Publication Data

US 2005/0018187 A1    Jan. 27, 2005

Related U.S. Application Data

(63) Continuation-in-part of application No. 09/948,278, filed on Sep. 7, 2001, now Pat. No. 6,952,260.

(51) Int. Cl.
  *G01J 3/28* (2006.01)
(52) U.S. Cl. .................. 356/326; 356/328; 356/334
(58) Field of Classification Search ............... 356/326, 356/327–334
See application file for complete search history.

(56) References Cited

U.S. PATENT DOCUMENTS 3,628,849 A    12/1971    Flamand et al.
3,930,728 A    1/1976    Pieuchard et al.

(Continued)

FOREIGN PATENT DOCUMENTS

WO    WO94/11725    5/1994

(Continued)

OTHER PUBLICATIONS

Yappert, M.C. et al., "Design and Evaluation of a Dual Multichannel Spectrometer for Simultaneous Molecular Absorption and Luminescence Measurments", Analytical Chemistry, Mar. 15, 1989, p. 593-600, vol. 61 No. 6, American Chemical Society, Washington, D.C., US.

*Primary Examiner*—Layla G. Lauchman
(74) *Attorney, Agent, or Firm*—Anthony H. Handal; Brown Rudnick Berlack Israels LLP (57) ABSTRACT

A spectrograph with a first concave spectrographic diffraction grating is positioned to receive light from an input light source. The first concave spectrographic diffraction grating is configured to provide a diffracted light output dispersing the components of the input light source in a first dispersion direction with a first angular orientation with respect to the plane of the grating. The dispersion forms the input light into an intermediate spectrum. The intermediate spectrum is formed in a focal surface by the once diffracted light. A slit is substantially positioned on the focal surface. A second concave diffraction grating is positioned to receive once diffracted light from the slit and configured to provide a twice diffracted light output, the second concave diffraction grating dispersing the components of the input light source in a second diffraction direction with a second angular orientation with respect to the plane of the grating. The second dispersion angular orientation is different from the first dispersion angular orientation. The second dispersion forms the input light into an output spectrum.

18 Claims, 4 Drawing Sheets

U.S. PATENT DOCUMENTS

| | | |
|---|---|---|
| 4,455,087 A | 6/1984 | Allemand et al. |
| 4,622,662 A | 11/1986 | Laude et al. |
| 5,002,393 A | 3/1991 | Thevenon et al. |
| 5,285,255 A | 2/1994 | Baranne et al. |
| 6,023,330 A | 2/2000 | Marshall et al. |
| 2003/0048442 A1 | 3/2003 | Xiao |
| 2005/0018187 A1 | 1/2005 | Slutter et al. |

FOREIGN PATENT DOCUMENTS

| | | |
|---|---|---|
| WO | PCT/US2005/013910 | 8/2005 |

DOUBLE GRATING THREE DIMENSIONAL SPECTROGRAPH WITH MULTI-DIRECTIONAL DIFFRACTION

CROSS-REFERENCE TO RELATED APPLICATION

This application is a continuation in part of U.S. patent application No. 09/948,278 filed Sep. 7, 2001, now U.S. Pat. No. 6,952,260, now U.S. Application Patent Publication No. US 2003/0048442 of Xiao, Published Mar. 13, 2003 and entitled DOUBLE GRATING THREE DIMENSIONAL SPECTROGRAPH.

TECHNICAL FIELD

This invention relates to diffraction-grating spectrographs and, more particularly, to a three dimensional, double diffraction grating spectrograph.

REFERENCE TO GOVERNMENT FUNDING

Not Applicable.

BACKGROUND OF THE INVENTION

It is known in the art to use various optical modules that are assembled into a desired configuration to perform a single specified optical function. Such configuration may take the form of a scientific instrument, or may find employment in a commercial spectroscopy application. It is usually advantageous to make each module as compact as possible.

A spectroscope, an instrument which produces a spectrum from input light, is one particularly useful example of such an optical instrument. The term "spectrum" is meant to encompass less than a complete range of wavelengths, for example, the collection of wavelengths emitted by a sample under excitation or passed by a sample filtering input light energy. Another example is a spectrograph which is a spectroscope provided with a recording device, or other light-capture means, or the like to receive and record or otherwise process the spectrum generated. The present invention relates to an optical arrangement particularly useful in spectrographs, and that term will be used hereinafter. However, it will be understood that the novel optics described herein can be employed in spectroscopes or spectrometers and generally all applications where recording, quantification or similar capabilities are required and the invention extends to such novel spectroscopic and spectrometric applications employing the inventive optics. To the extent that the invention may be applied to output a single spectral band or to provide a scanned output comprising a series of individual spectral bands, the term "spectrometer" should also be understood to include monochromators.

Diffraction grating spectrographs use one or more diffraction gratings to diffract input light into a spectrum of specific wavelengths or spectral bands. In a typical configuration, spectrographs are designed to select a single wavelength, or a narrow spectral band from the input light, for examination or recordal.

In one known embodiment of spectrometer employing a planar diffraction grating, a concave mirror is illuminated by a point source whose spectrographic composition is to be analyzed. The light from the point source is collimated by the concave mirror to form a parallel bundle of rays, which are caused to fall upon the surface of a planar diffraction grating. This concave mirror is known as a collimator in a typical spectrometer instrument. Because the planar diffraction grating has a number of grooves etched in its surface, light falling on the surface of the diffraction grating is diffracted, that is, reflected at an angle which is a function of the wavelength of the light. If the input light source comprises a number of wavelengths, the result is that light of different wavelengths will be diffracted, or reflected, at an angle which is a function of wavelength.

The diffracted light may then be received by a second concave mirror which focuses the diffracted light to form an image of the point source under analysis. However, because light of different wavelengths has been diffracted at different angles, the point source is imaged by the second concave mirror, also known as a focusing mirror, at different points for different wavelengths. Accordingly, it is possible to select out individual wavelengths, or more precisely a narrow region of the spectrum, or spectral band, consisting essentially of a single wavelength, to measure the intensity of the same and to utilize this information, for example for elemental analysis of an emissive source material.

Spectrometric elemental analysis of samples has many industrial uses. For example, in the case of the analysis of industrial slag, such as might be obtained from a crucible filled with molten metal in a steel furnace, the slag may be exited into a plasma, and the emission spectrum analyzed and measured with a spectrometer. The wavelengths appearing in the plasma emission spectra indicate the nature and quantity of the impurities in the slag, enabling plant operators to adjust production parameters to achieve a desired product.

While the above discussion has centered on spectrometer devices using mirrors, and such devices are usually preferred because of the quality of imaging using mirrors, it is possible to construct devices using focusing lenses, such as convex lenses or compound multi-element lenses having an overall convex optical characteristic. In principle, it is also possible to combine lenses and mirrors in an instrument.

It is also noted that diffraction gratings in spectrometers may be either classical mechanically ruled diffraction gratings of the type invented and made by applicant's assignee at the beginning of the 1800's, or holographic diffraction gratings of the type pioneered by applicant's assignee since the 1960's.

It is also known that spectrometers may be constructed using concave diffraction gratings, such as concave holographic diffraction gratings of the type invented by Flamand in the late 1960's working at the applicant company as illustrated by his U.S. Pat. No. 3,628,849.

A Littrow-mounted system is a relatively common method of utilizing large plane reflection gratings, providing simplicity and good optical quality arising from the use of a single mirror to perform both collimating and focusing functions. Moreover, in this configuration, the collimating and focusing functions are both performed in the same geometric space, resulting in efficient use of that space. In a typical Littrow setup, a mirror delivers parallel incident light from an input point source to the grating, and focuses diffracted light received from the grating to an output point often proximate the input point source. In such devices, a single mirror acts as both collimator and focusing element at once, minimizing the number of optical elements required.

In addition to its simplicity, employing the Littrow configuration is particularly desirable for its high quality output. Because the input and output light beams traverse the same optical path, in opposite directions, optical aberrations in the collimating and focusing components are auto-corrected, or self compensating, so that image quality is diffraction limited, i.e. limited by the physical properties of the optical system not by the deficiencies of the optics.

A particular drawback of such conventional Littrow-mounted grating configurations is the difficulty and expense of providing a grating with a central optical opening. Another drawback is that undue stray light may be returned to the aperture by the mirror. It would be desirable to provide a spectrometer or comparable optical system, which did not suffer from these drawbacks.

SUMMARY OF THE INVENTION

A spectrograph providing a light output in a selected spectral band from a sample light input comprises an input light source. A first concave spectrographic diffraction grating is positioned to receive light from the input light source and is configured to provide a diffracted light output dispersing the components of the input light source in a first direction. The dispersion forms the input light into an intermediate spectrum. The intermediate spectrum is formed in a focal surface by the once diffracted light. A slit is substantially positioned on the focal surface or approximately on the focal surface to accommodate a mechanical member which may be movably mounted to vary the position of the slit on the focal surface.

The spectrum is formed along the vertical axis, lengthwise along the slit. The bottom edge of the slit corresponds to the shortest wavelength for light to be passed by the slit. The top edge has a position which corresponds to the longest wavelength for light to be passed by the slit. The spectral resolution is determined by the input width coupled with the imaging properties of the concave diffraction grating. The height determines the spectral range of the device.

A second concave diffraction grating is positioned to receive once diffracted light from the slit and configured to provide a twice diffracted light output, the second concave diffraction grating dispersing the components of the input light source in a second dispersion direction. In the preferred embodiment, the second direction is perpendicular to the first direction. The second dispersion forms the input light into an output spectrum. The output spectrum is formed on a focal surface by the twice diffracted light. A measuring device is positioned substantially along the focal plane formed by the second concave diffraction grating. The output spectrum is dispersed diagonally, with each wavelength dispersed at a different height on the focal plane.

The measuring device may be a solid state detector array, a linear diode array or the like.

In an alternative embodiment, the first diffraction grating can be mounted for rotation to permit selection of the light output wavelength or spectral band and the second diffraction grating can be mounted for rotation to permit selection of the width of the light output. In this alternate embodiment, the input spectrum, at the intermediate slit position may also be rotated to be not parallel to the input slit. In another embodiment, a motorized computer controlled mounting for rotating the first and/or second diffraction gratings, and or rotatably mounted intermediate slit (if a rotatably mounted intermediate slit is provided) can be utilized.

BRIEF DESCRIPTION OF THE DRAWINGS

The advantages, and the system and apparatus of the present invention will be understood from the following description taken together with the drawings, in which.

DETAILED DESCRIPTION OF THE INVENTION

Referring to FIGS. 1-5, the operation of the inventive double grating three dimensional spectrograph system 10 may be understood. Generally, system 10 comprises a light source such as fiber optic input 12, an optional entrance slit 14, a first concave grating 16, a middle slit 18, a second concave grating 20, and a measurement or recording system 32. See FIG. 2. System 32 receives an output spectra illustrated in greater detail in FIG. 3.

Directional references herein, for convenience, are made with respect to the orientation of spectrograph 10 as shown in the figures, where light source 12 is on the right, first grating 16 is on the left, second grating 20 is on the right with middle slit 18 disposed between grating 16 and grating 20. It is understood that, in practice, spectrograph 10 may have any desired orientation.

Figure 4:
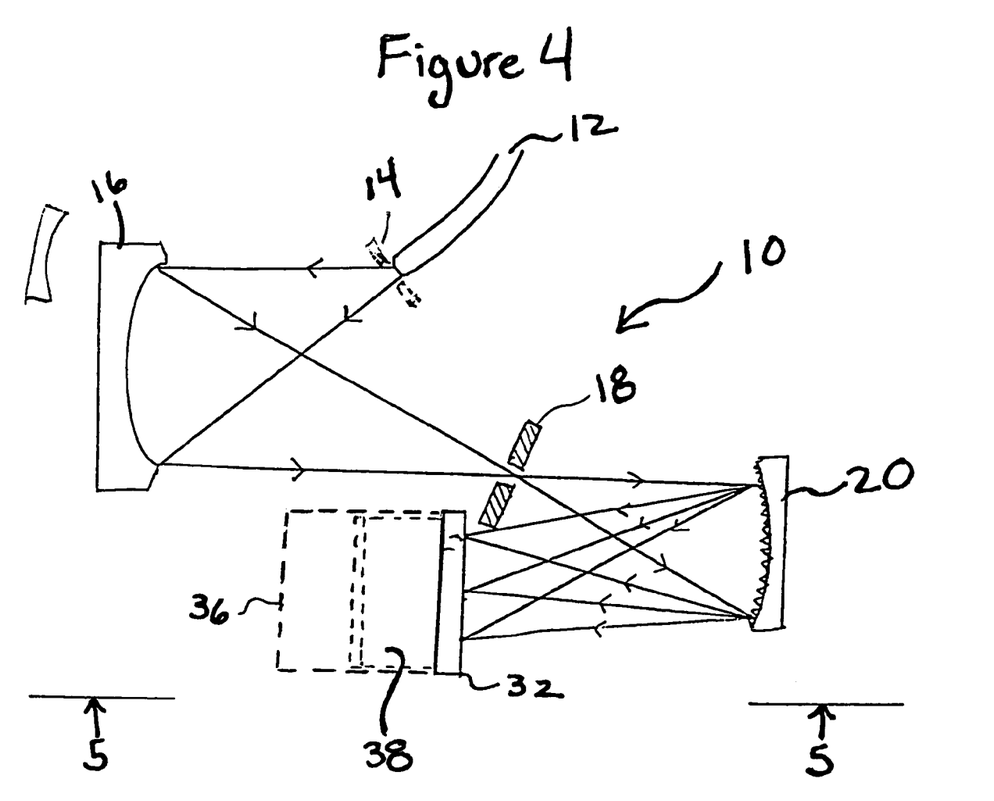
FIG. 4 is an illustration of a top view of the embodiment of the present invention.
Figure 5:
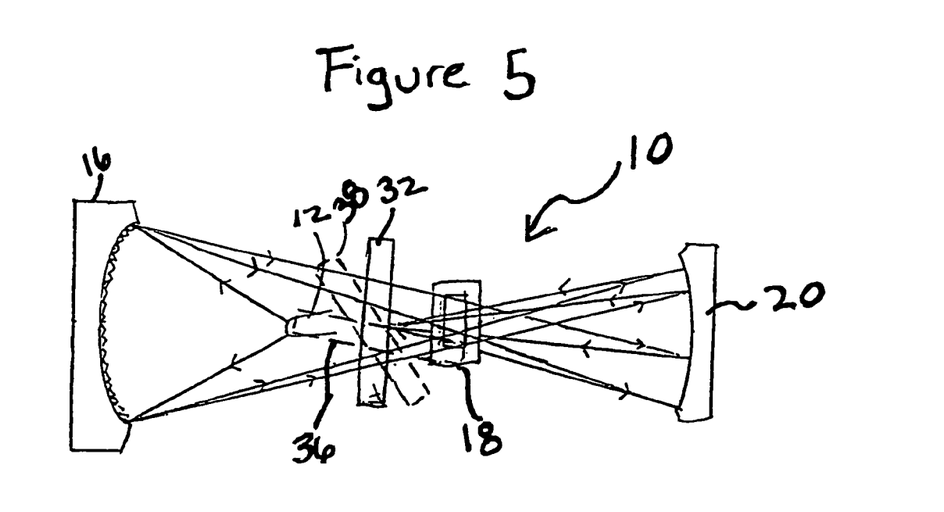
FIG. 5 is illustration of a side view of the present invention viewed along line 5-5 of FIG. 4.

As can be seen clearly in FIGS. 4 and 5, optic fiber input 12, entrance slit 14, first concave grating 16, middle slit 18, second concave grating 20, and measurement or recording system 32 have centers which all lie in the same plane. Fiber optic 12, entrance slit 14, first concave grating 16, middle slit 18, second concave grating 20, and measurement or recording system 32 are all oriented perpendicular to the plane in which they lie. Grating 16 is oriented parallel to grating 20 or at an angle determined by and specific to the grating 16 employed, with the optical axis of grating 16 parallel or at an angle to the optical axis of grating 20. Middle slit 18 is oriented with its out-of-plane edges 41 and 43 defining those points on the spectrum associated with the shorter and longer wavelength ranges, respectively, of the spectrum produced by grating 16. In accordance with the preferred embodiment, middle slit 18 is oriented parallel to and on the focal point of the spectrum produced by grating 16, allowing for easy adjustment of the position and height of the slit to various positions on the spectrum by movement along a track or by other mechanical artifice.

Measurement or recording system 32 is oriented to coincide with the focal plane of grating 20. It may be substantially planar or it may be varied in configuration to coincide to the shape of the focal plane imaged by grating 20. Alternative recording system orientations are illustrated in phantom lines in FIG. 4 wherein recording system 36 is substantially perpendicular to the plane of grating 20. Likewise, recording system 38 can be oriented somewhere between substantially planar and substantially perpendicular. The orientation of recording system 32 being grating dependant.

Spectrograph 10 receives input light to be analyzed from any source, such as a fiber optic 12. Light 15 (FIG. 1) is directed onto first grating 16. The distance between the center of grating 16 and the center of slit 14 is determined by the focal distance of concave grating 16. Grating 16 diffracts incident light 15 to create diffracted light 17. Such diffraction is achieved by the light being dispersed in a first direction. The direction of such dispersion is a function of the orientation of the grooves of the grating in grating 16. This orientation is schematically indicated in FIG. 5. In accordance with a preferred embodiment, the grooves of grating 16 are generally parallel to the plane of the paper illustrating the inventive system in FIG. 4. Light 17 passes through middle slit 18. Middle slit 18 selects a spectral segment, outputting this light as light 19.

After leaving middle slit 18, light 19 is caused to fall onto second grating 20. Second grating 20 is oriented in accordance with the preferred embodiment of the invention with its grooves roughly perpendicular to the grooves in first grating 16, as is seen most clearly in FIG. 4. This results in the dispersion of light 19 into twice diffracted light 21. The orientation of the first and second gratings with respect to each other results in the dispersion of light in second grating 20 being substantially perpendicular to the dispersion of light by first grating 16. Such orientation need not be perpendicular as variation will largely change only the orientation of the output spectra.

First grating 16 and second grating 20 are disposed with their center of curvature and optical axes substantially in the same plane. Twice diffracted light 21 is then caused to fall onto measurement or recording system 32.

Measurements or recording system 32 may take any one of a number of forms. For example, it may simply be a sheet of photographic paper, a photographic negative, or a light sensitive device such as a conventional television tube or an image intensifier. It may also a solid-state device, such as a linear matrix of detectors, or a two-dimensional array of solid-state detectors as would be employed, for example, a charge coupled device (CCD).

Light source 12 may be of any suitable type, for example, an emission source, a fluorescence source, a Raman source, absorption spectra, or the like, or even a light source for use in spectroscopy or any other use where the characteristics of the light source should be determined. Optical aperture 14 may take any suitable form, such as a slit, as would be employed in spectroscopy and similar applications. In addition, aperture 14 may be provided with radiation in any one of numerous fashions known in the art, including directly, by a fiber optic bundle, lens, mirror, or other suitable focusing or other light transmitting means.

The light 15 input into the system is usually a mixture of light of different wavelengths, for example, such as are produced by a plasma, hot body radiation, or particles of gas and plasma, but in certain cases it is contemplated, that the invention may be used for calibrating, detecting or measuring substantially monochromatic light. Typical sample sources are industrial materials, such as steel slag samples, raised to a sufficient temperature to emit characteristic elemental spectra, light that has been passed through biological or other fluids to generate an absorption spectra and a wide variety of scientific applications, typical of those where spectroscopy is employed.

The advantages of the system flow from the fact that the two gratings of the system disperse light in different directions, with particularly good results achieved when such dispersions are at right angles to each other. The invention may be applied to a wide variety of systems. For example, the groove density may be varied depending upon the desired operating wavelength of light. If one desires to make a more compact system, the gratings may be positioned with their dispersions at something less than a right angle.

It is noted that a simple dual grating spectrograph, while providing increased dispersion, would fail to improve instrument straylight rejection. In the preferred embodiment of the inventive system, the simultaneous employment of two different dispersion directions offers rejection of multiple diffraction orders, from the diffraction, from overlapping onto the system detector. Removal of multiple orders from the output improves the spectral quality.

In accordance with another alternative, rotation of the input spectrum relative to the intermediate input slit allows for straylight reduction characteristics not achievable in a simple double grating spectrograph design. Diffraction grating 16 is repetitively slightly rotated alternately in opposite directions as indicated by arrows 16a relative to the intermediate slit, to allow only a small portion of the spectrum through the intermediate slit at one time. The axis of rotation 16b is in the plane of the grating and parallel to the intermediate slit. Use of a vibrating assembly best accomplishes this motion, which has the effect of scanning the device through a range of wavelengths.

In yet another embodiment, a sample replaces the intermediate slit. In this embodiment, fluorescence and absorbance spectra can be measured with improved straylight advantages not available in spectrograph form today. Relay optics between the sample and the input slit of the second spectrograph allows the rotation of the spectrum or addition of apertures on the second input slit.

Any suitable mounting and drive motor may be used to impart reciprocating angular motion to grating 16 provided that the grooves of diffraction grating 16 are slightly rotated from perpendicular to intermediate aperture 27. The result is that the wavelength of light input into the system is scanned to select a range of input wavelengths selected from the output of light source 12. Accordingly, only a portion of the light being analyzed is input into the system at one time. Thus, straylight such as stray light that would otherwise be associated with other wavelenghts that would be input into the system, is avoided. If the vibrating grating moves the spectra past the slit 100 times per second, and a one second integration time is used, the resultant spectra will have significantly higher straylight rejection compared to a similar arrangement where the entire spectra is allowed to enter the second spectrograph.

In use, light 15 to be analyzed is introduced into the system through a fiber-optic input 12. The emitted light can then pass through optical aperture or slit 14. Slit 14 has a width of 6 mm and an adjustable height of less than 100 μm. Alternately, slit 14 may be eliminated and the simple output of a fiber optic member, either a single fiber, or a bundle of fibers, used directly.

Grating 16 is of the type sold under catalog number CP-20, by Jobin Yvon. It has a concave configuration, with a radius of curvature of 20 mm, a diameter of 8 mm, a groove density of 550, and is normally employed with a working spectral range of 300-800 nm. The expanded useful spectral range of this grating using the inventive configuration, as described in detail below, is noted.

Grating 16 produces an output 23 comprising a spectrum of wavelengths which includes a range of wavelengths including a selected wavelength range defined spatially at reference numeral 25. In spectrum output 23 shorter wavelengths are lower in FIG. 1 and longer wavelengths are higher in FIG. 1. Selected segment 25 in resultant spectrum 23 is then passed by aperture 27 in middle slit 18. Aperture 27 has two edges 41 and 43 which are positioned to coincide with the position of light having a wavelength corresponding with the edges of the spectrum to be passed. By "edges of the spectrum" is meant the shortest wavelength passed by aperture 27 and the longest wavelength passed by aperture 27. It will be understood that aperture 27 passes both the shortest and the longest wavelength and all the wavelengths in between these two wavelengths. Aperture 27 is oriented parallel to the direction of dispersion of light by grating 16. The distance between the center of aperture 27 and the center of grating 16 is about 25 mm. The distance between the center of aperture 27 of middle slit 18 and the center of slit 14 is about 20 mm.

Figure 1:
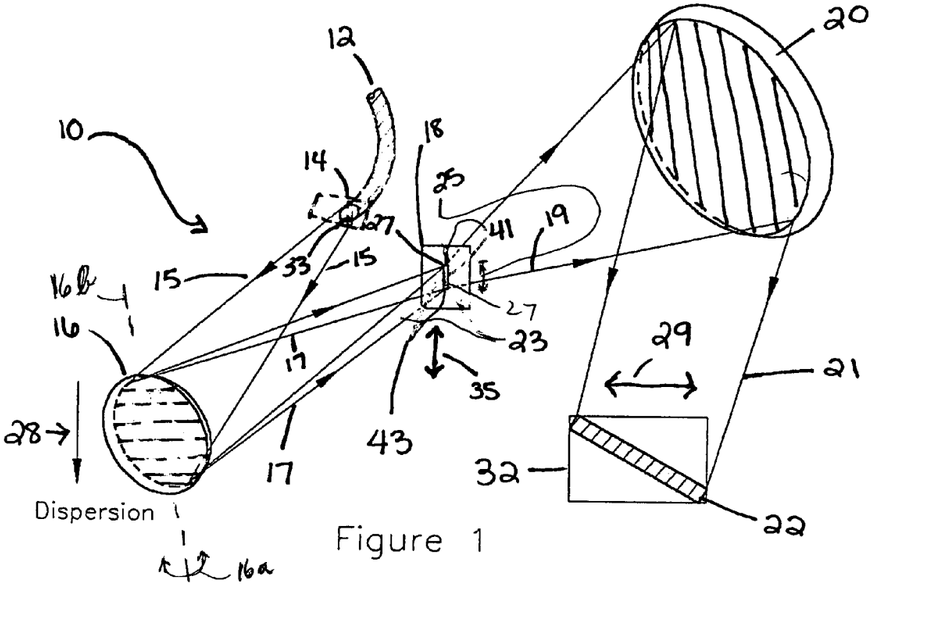
FIG. 1 is a perspective schematic view of an embodiment of the present invention illustrating the orientation and relation of the parts thereof.
Figure 2:
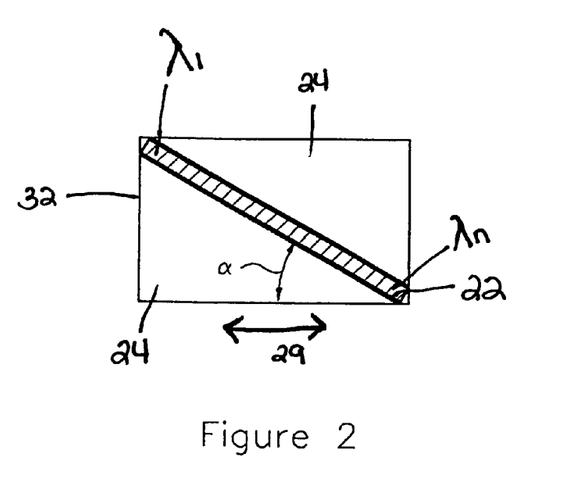
FIG. 2 is a representation of the transmission display medium illustrating a resultant spectral transmission.

In the preferred embodiment, aperture 27 in middle slit 18 has a length of less than 6 mm. The width of middle slit 18 is 0.05 mm. Although aperture 27 can be greater then 6 mm in height, the quality of light 19 projected onto second grating 20 would be compromised as would the image output by the system. The height of aperture 27 determines the wavelength range that will be imaged on measurement or recording device 32. This is the case because light is dispersed by grating 20 along direction 29, as illustrated in FIG. 2, and window 27 has its length oriented perpendicular to direction 29. In spectrum 22 shorter wavelengths are on the left in FIG. 1 and longer wavelengths are on the right in FIG. 1.

The distance between the center of grating 20 and the center of aperture 27, in accordance with the preferred embodiment is 137 mm. The distance between the center of grating 20 and the center of grating 16, in accordance with the preferred embodiment is 160 mm. The distance between the center of grating 20 and the center of measurement or recording device 32 is 135 mm. More particularly, aperture 27 is positioned at the point recommended by the manufacturer for the position of the aperture with respect to grating 20.

The input height of the source determines the final resolution of the output spectra emitted onto measurement or recording device 32. The spectral segment is then projected onto second grating 20.

Grating 20 is of the type sold by Jobin Yvon under catalog number CP-140. It has concave configuration with a diameter of 70 mm, radius of curvature of 140 mm, a groove density of 230 grooves per mm, and a normal working spectral range of 380-780 nanometers. The groove density may be varied depending upon the desired operating wavelength of light, with closer grooves being used for shorter wavelengths of light. The diameter of grating 20 must be much larger than the height of middle slit 18 for uniform efficiency for the various wavelengths of light that may be projected upon it.

In accordance with the preferred embodiment, grating 16 and/or grating 20 is of a type that is aberration correcting as covered under U.S. Pat. Nos. 3,628,849 and 3,930,728.

Alternatively, gratings 16 and 20 can be plane gratings or aberration correcting plane gratings. Such plane gratings are employed in a Czerny-Turner monochromator.

In accordance with the preferred embodiment, grating 20 is disposed such that it disperses light perpendicular to first grating 16. Grating 16 and grating 20 have been shown as having a round configuration. Other suitable shapes may be utilized in practicing the invention, as will be apparent to those of ordinary skill in the art. The resultant spectral emission is then projected onto measurement or recording device 32.

Referring to FIG. 2, measurement or recording device 32 is positioned with the center of measurement or recording device 32 at a distance of approximately 135 mm from the center of grating 20. This position coincides with the position of the focal plane of grating 20 and measurement or recording device 32 is oriented to substantially coincide with the focal plane. Alternatively, measurement or recording device 32 may be shaped to conform to the shape of a focal surface whose shape is not substantially planar. Measurement or recording device 32 may be made of any suitable material, such as photographic paper, or may take the form of any suitable device, such as an input device for a spectral analyzer.

System 10 is designed to have stray light rejection on the order of $10^{-6}$ to $10^{-5}$. Second and higher order spectra are outside of the resultant spectrum 22. However, devices and materials specific for this type of detection can be utilized to gather spectral information that falls into the ultraviolet or infrared ranges.

The resultant spectrum 22 (FIG. 3) is a product of the spectral content of light source 12 to be analyzed.

The same is first broken down by first grating 16 which disperses the light into a spectrum 23 in the direction indicated by arrow 35. Spectrum 23 is formed by diffracted light 17. The wavelength range to be selected is determined by aperture 27 of middle slit 18.

The selected light 19 output by aperture 27, after being diffracted a second time by grating 20 is dispersed in the direction of arrow 29 onto measurement or recording device 32, where it forms an output spectrum 30.

Figure 3:
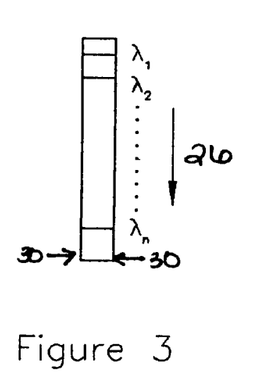
FIG. 3 is an illustration of the spectral transmission.

The content of spectrum 30 may be understood from FIG. 3. Spectrum 30 comprises a range of wavelengths $\lambda_1$ through $\lambda_n$ within the selected spectral range.

The resultant direction of dispersion of light is illustrated by arrow 26. Referring back to FIG. 2, the tangent of angle α is determined by the formula:

$$\tan \alpha = D_1/D_2,$$

where $D_1$ is the dispersion of grating 16 and $D_2$ is the dispersion of grating 20.

The spectroscopic system 10 of the present invention is designed to function analyzing light in the ultraviolet wavelengths, down to a wavelength of approximately 180 nm, into the infrared range to wavelengths on the order of 10 nm The inventive spectrograph 10 can be contained in a light tight housing which excludes substantially all stray light from the housed optical elements. The housing should be robust and durable to protect the optics during use and be sufficiently rigid to maintain the proper geometric relationship between the elements. The housing can be internally configured to support gratings 16 and 20 for rotation, and shaped to accommodate such rotation. The inside of the housing is painted with a flat black paint, which probably has a relatively rough surface. Additionally, the housing can have a suitable opening or openings for light source 12 and connections to measurement or recording device 32 and may be provided externally with mounting structures such as threaded extensions, bosses, recesses or aperture flanges for attachment to other modules or equipment.

If desired, a motorized and optionally computer controlled mounting can be provided for rotating grating 16 to allow only a small portion of the spectrum through the intermediate slit to reach diffraction grating 20 at one time. If all the input light passes into the second grating the grating is illuminated with this input light. The grating scatters the light which causes straylight to be detected by the detector. The inventive double monochromator shows improved straylight rejection because only one wavelength of light enters into the second half of the instrument at one time. By moving the input beam to only allow some wavelengths to enter the second half of the spectrograph, additional stray-light rejection is achieved.

Further, a motorized and optionally computer-controlled mounting can be provided for moving slit 18 in the Y-axis to automate the scanning of available wavelengths used to provide the absorptive information of the sample under observation. Such automatic motion is performed in order to change the range of wavelengths detected by detector 32.

Further, a motorized and optionally computer-controlled mounting can be provided for adjusting the width of slit 18 to change the height of the output spectrum.

Figure 6:
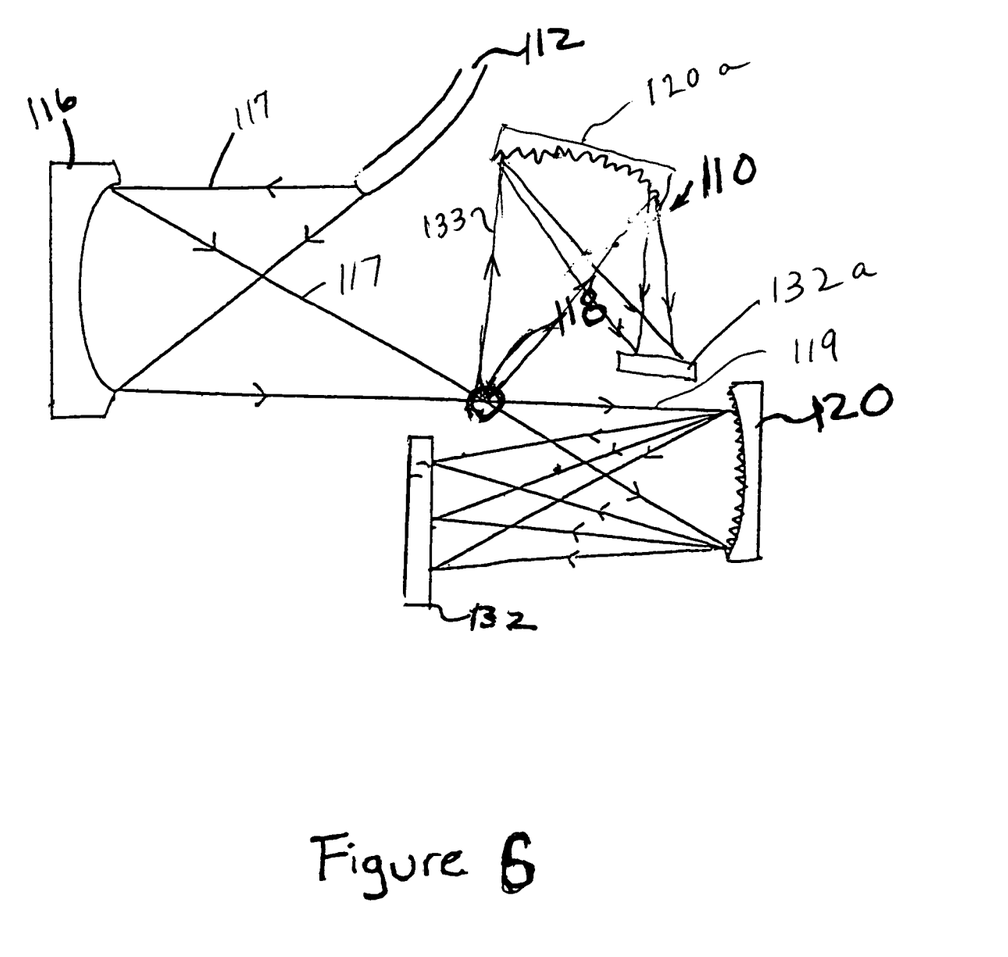
FIG. 6 illustrates an alternative embodiment of the invention for measuring the absorbance and fluorescence characteristics of a sample.

Referring to FIG. 6, an alternative embodiment of the present invention is illustrated. In this and the later embodiment, parts corresponding to the embodiment of FIGS. 1-5 are numbered a multiple of one hundred higher than their corresponding earlier embodiment parts.

In the FIG. 6 spectrograph 110, light is input through bundle 112 and falls on diffraction grating 116. Grating 116 focuses and diffracts light 117 on to a sample 118, resulting in the transmission of an absorbance spectra 119 to concave diffraction grating 120 for imaging on detector 132.

A fluorescence spectra 133 is emitted by sample 118 and focused by a concave grating 120*a* onto a second detector 132*a*. The result is to simultaneously obtain both fluorescence and absorbance information. This may be of particular value in complex material systems or other materials which my exhibit instability over time.

In use, a sample 118 is placed at the intermediate slit position. The sample illumination serves as the input with the wavelength dispersed along the height of the sample. Emission from the sample at about 90 degrees to the path of illumination, in the horizontal plane, provides fluorescence spectra to be imaged onto the image detector. Detection of light transmitted straight through the sample and collected by the second grating provides absorbance spectra to be imaged onto another image detector.

Figure 7:
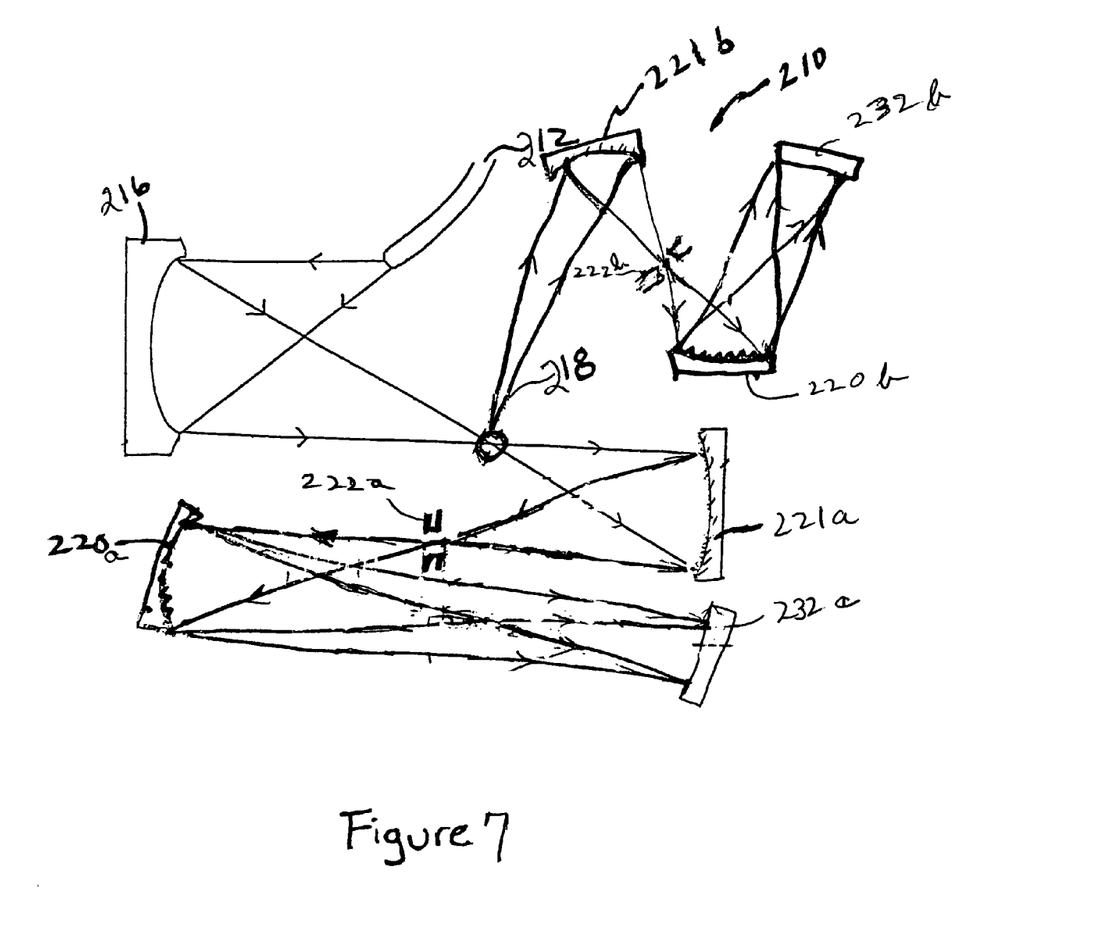
FIG. 7 illustrates yet another alternative embodiment of the invention.

As illustrated in FIG. 7, additional concave collection mirror 221*a* is utilized to collect the light output from a sample 218 (collection at 90 degrees for fluorescence or collection straight through for absorbance), and re-imaged onto an input slit of the second spectrograph. This adds improved selectability of the light to be analyzed by selecting only the portion of the illuminated sample for analysis.

More particularly, referring to FIG. 7, light input into the system 210 through bundle 212 falls on grating 216. Grating 216 focuses the light onto sample 218, which passes absorbance spectra to concave mirror 221*a*. Mirror 221*a* passes light through slit 222*a* to illuminate grating 220*a*. Grating 220*a* outputs to detector 232*a* to allow measurement of the detected spectra.

In similar fashion, fluorescence information is emitted toward concave mirror 221*b*, which focus light onto diffraction grating 220*b*, which illuminates detector 232*b* to provide a signal output.

While an illustrative embodiment of the invention has been described, it is, of course, understood that various modifications of the invention, with the benefit of this disclosure, will be obvious to those of ordinary skill in the art. Such modifications are within the spirit and scope of the invention which is limited and defined by the appended claims.

We claim:

1. A device for separating light into its components providing a light output in a selected spectral band from a sample light input into the device for separating light into its components, comprising:

(a) an input light source having a wavelength component or components;
   (b) a first concave spectrographic diffraction grating, said first concave grating defining first optical grooves and being positioned to receive light from said input light source, said first grooves being oriented in a first direction and said first grooves being configured to provide once diffracted light, dispersing said components of said input light source in a first dispersive direction, said dispersing forming said input light into an intermediate spectrum, said intermediate spectrum being formed on a focal surface by said once diffracted light;
   (c) a slit substantially positioned on said focal surface or approximately on said focal surface, said slit having a first edge whose position corresponds to the shortest wavelength for light to be passed by said slit and having a second edge, whose position corresponds to the longest wavelength for light to be passed by said slit; and
   (d) a second concave diffraction grating, said second concave diffraction grating defining second optical grooves positioned to receive once diffracted light from said slit, said second grooves being oriented in a second direction and said second grooves being configured to provide a twice diffracted light, said second concave diffraction grating dispersing the components of said once diffracted light in a second dispersive direction, said second dispersive direction extending across said first dispersive direction, said dispersion forming said input light into an output spectra, said output spectra being formed on a focal surface by said twice diffracted light.

2. A device for separating light into its components providing a light output in a selected spectral band from a sample light input into the device for separating light into its components, comprising:

(a) an input light source having a wavelength component or components;
   (b) a first concave spectrographic diffraction grating, said first concave grating defining first optical grooves and being positioned to receive light from said input light source, said first grooves being oriented in a first direction and said first grooves being configured to provide once diffracted light, dispersing said components of said input light source in a first dispersive direction, said dispersing forming said input light into an intermediate spectrum, said intermediate spectrum being formed on a focal surface by said once diffracted light;
   (c) a slit substantially positioned on said focal surface or approximately on said focal surface, said slit having a first edge whose position corresponds to the shortest wavelength for light to be passed by said slit and having a second edge, whose position corresponds to the longest wavelength for light to be passed by said slit; and
   (d) a second concave diffraction grating, said second concave diffraction grating defining second optical grooves positioned to receive once diffracted light from said slit, said second grooves being oriented in a second direction and said second grooves being configured to provide a twice diffracted light, said second concave diffraction grating dispersing the components of said once diffracted light in a second dispersive direction, said second dispersive direction extending across said first dispersive direction, said dispersion forming said input light into an output spectra, said output spectra being formed on a focal surface by said twice diffracted light, wherein the centers of said input light source, said gratings and said slit roughly define a plane, and said first dispersive direction extends from one side of the plane to the opposite side of said plane.

3. A device for separating light into its components providing a light output in a selected spectral band from a sample light input into the device for separating light into its components, comprising:
   (a) an input light source having a wavelength component or components;
   (b) a first concave spectrographic diffraction grating, said first concave grating defining first optical grooves and being positioned to receive light from said input light source, said first grooves being oriented in a first direction and said first grooves being configured to provide once diffracted light, dispersing said components of said input light source in a first dispersive direction, said dispersing forming said input light into an intermediate spectrum, said intermediate spectrum being formed on a focal surface by said once diffracted light;
   (c) a slit substantially positioned on said focal surface or approximately on said focal surface, said slit having a first edge whose position corresponds to the shortest wavelength for light to be passed by said slit and having a second edge, whose position corresponds to the longest wavelength for light to be passed by said slit; and
   (d) a second concave diffraction grating, said second concave diffraction grating defining second optical grooves positioned to receive once diffracted light from said slit, said second grooves being oriented in a second direction and said second grooves being configured to provide a twice diffracted light, said second concave diffraction grating dispersing the components of said once diffracted light in a second dispersive direction, said second dispersive direction extending across said first dispersive direction, said dispersion forming said input light into an output spectra, said output spectra being formed on a focal surface by said twice diffracted light wherein the centers of said input light source, said gratings and said slit roughly define a plane, and said first dispersive direction extends across said plane.

4. A device for separating light into its components providing a light output in a selected spectral band from a sample light input into the device for separating light into its components, comprising:
   (a) an input light source having a wavelength component or components;
   (b) a first concave spectrographic diffraction grating, said first concave grating defining first optical grooves and being positioned to receive light from said input light source, said first grooves being oriented in a first direction and said first grooves being configured to provide once diffracted light, dispersing said components of said input light source in a first dispersive direction, said dispersing forming said input light into an intermediate spectrum, said intermediate spectrum being formed on a focal surface by said once diffracted light;
   (c) a slit substantially positioned on said focal surface or approximately on said focal surface, said slit having a first edge whose position corresponds to the shortest wavelength for light to be passed by said slit and having a second edge, whose position corresponds to the longest wavelength for light to be passed by said slit; and
   (d) a second concave diffraction grating, said second concave diffraction grating defining second optical grooves positioned to receive once diffracted light from said slit, said second grooves being oriented in a second direction and said second grooves being configured to provide a twice diffracted light, said second concave diffraction grating dispersing the components of said once diffracted light in a second dispersive direction, said second dispersive direction extending across said first dispersive direction, said dispersion forming said input light into an output spectra, said output spectra being formed on a focal surface by said twice diffracted light wherein the centers of said input light source, said gratings and said slit roughly define a plane but may lie in said plane, and said first dispersive direction extends across said plane, wherein said first dispersive direction is approximately perpendicular to said plane.

5. A device for separating light into its components providing a light output in a selected spectral band from a sample light input into the device for separating light into its components, comprising:
   (a) an input light source having a wavelength component or components;
   (b) a first concave spectrographic diffraction grating, said first concave grating defining first optical grooves and being positioned to receive light from said input light source, said first grooves being oriented in a first direction and said first grooves being configured to provide once diffracted light, dispersing said components of said input light source in a first dispersive direction, said dispersing forming said input light into an intermediate spectrum, said intermediate spectrum being formed on a focal surface by said once diffracted light;
   (c) a slit substantially positioned on said focal surface or approximately on said focal surface, said slit having a first edge whose position corresponds to the shortest wavelength for light to be passed by said slit and having a second edge, whose position corresponds to the longest wavelength for light to be passed by said slit; and
   (d) a second concave diffraction grating, said second concave diffraction grating defining second optical grooves positioned to receive once diffracted light from said slit, said second grooves being oriented in a second direction and said second grooves being configured to provide a twice diffracted light, said second concave diffraction grating dispersing the components of said once diffracted light in a second dispersive direction, said second dispersive direction extending across said first dispersive direction, said dispersion forming said input light into an output spectra, said output spectra being formed on a focal surface by said twice diffracted light wherein said first concave diffraction grating is vibrated.

6. A device for separating light into its components as in claim 1, further comprising a measuring device positioned substantially along the focal surface of said second concave diffraction grating.

7. A device for separating light into its components as in claim 6, wherein said measuring device is a solid-state detector array.

8. A device for separating light into its components as in claim 1, further comprising a rotary mounting for rotatably supporting said first concave diffraction grating.

9. A device for separating light into its components providing a light output in a selected spectral band from a sample light input into the device for separating light into its components, comprising:
   (a) an input light source having a wavelength component or components;
   (b) a first concave spectrographic diffraction grating, said first concave grating defining first optical grooves and being positioned to receive light from said input light source, said first grooves being oriented in a first direction and said first grooves being configured to provide once diffracted light, dispersing said components of said input light source in a first dispersive direction, said dispersing forming said input light into an intermediate spectrum, said intermediate spectrum being formed on a focal surface by said once diffracted light;
   (c) a slit substantially positioned on said focal surface or approximately on said focal surface, said slit having a first edge whose position corresponds to the shortest wavelength for light to be passed by said slit and having a second edge, whose position corresponds to the longest wavelength for light to be passed by said slit; and
   d) a second concave diffraction grating, said second concave diffraction grating defining second optical grooves positioned to receive once diffracted light from said slit, said second grooves being oriented in a second direction and said second grooves being configured to provide a twice diffracted light, said second concave diffraction grating dispersing the components of said once diffracted light in a second dispersive direction, said second dispersive direction extending across said first dispersive direction, said dispersion forming said input light into an output spectra, said output spectra being formed on a focal surface by said twice diffracted light, further comprising
   (e) an angularly reciprocating mounting supporting said first concave diffraction grating for rotation and a drive mechanism for reciprocatingly moving said first grating between first and second angular positions to scan a range of input light source wavelengths when said first diffraction grating has its grooves slightly away from perpendicular to said intermediate slit.

10. A device for separating light into its components according to claim 1, wherein said input light source comprises a fiber optic bundle disposed at an aperture.

11. A device for separating light into its components according to claim 1, operable at wavelengths in a range of 180 nm to 10 nm.

12. A device for separating light into its components according to claim 1 wherein stray light rejection is in the order of 1/100000 to 1/1000000.

13. A device for separating light into its components according to claim 1, wherein said first and second grating have a groove density of 60 grooves per millimeter or higher.

14. A device for separating light into its components according to claim 1, wherein the height of said intermediate slit determines the range of a spectral segment.

15. A device for separating light into its components providing a light output in a selected spectral band from a sample light input into the device for separating light into its components, comprising:
   (a) an input light source;
   (b) a first concave spectrographic diffraction grating positioned to receive light from said input light source and having an angular groove orientation defining a first angular direction and configured to provide a diffracted light output dispersing the components of said input light source in the Y direction, said dispersion forming said input light into an intermediate spectrum, said intermediate spectrum being formed in a focal surface by said once diffracted light;
   (c) a sample substantially positioned on said focal surface or approximately on said focal surface, said sample transmitting said diffracted light output as transmitted light and fluorescing to produce fluorescent light; and
   (d) a second concave diffraction grating positioned to receive transmitted light, said second concave diffraction grating having a second angular groove orientation defining a second direction configured to provide a first twice diffracted light output, said second concave diffraction grating dispersing the components of said transmitted light source in the X direction, angularly transverse to the first grating, said X direction being different from said first direction, said dispersion forming said input light into a first output spectra, said first output spectra being formed on a focal surface by said first twice diffracted light; and
   (e) a third concave diffraction grating positioned to receive fluorescent light, said third concave diffraction grating having a third angular groove orientation defining a third direction, and configured to provide a second twice diffracted light output, said third concave diffraction grating dispersing the components of said fluorescent light source in the X direction, substantially angularly transverse to the first grating, said X direction being different from said Y direction, said dispersion forming said fluorescent light into a second output spectra, said second output spectra being formed on a focal surface by said second twice diffracted light output.

16. A device as in claim 15, wherein said first concave diffraction grating defined optical groove oriented in a first angular direction with respect to a first plane transverse to an instrument plane roughly defined by said grating and said source, and said second and third concave diffraction gratings define grooves angularly transverse to said first angular direction.

17. A device as in claim 15, wherein a first concave mirror focuses transmitted light from said sample to said second grating and a second concave mirror focuses fluorescent light from said sample to said third grating.

18. A device for separating light into its components providing a light output in a spectral band from sample light input into the device, comprising:
   (a) an input light source;
   (b) a first concave spectrographic diffraction grating positioned to receive light from said input light source and configured to provide a once diffracted light output dispersing the components of said input light source, said dispersing forming said input light into an intermediate spectra, said intermediate spectra being formed in a focal volume by said once diffracted light;
   (c) a slit substantially positioned approximately in said focal volume, said slit having a first edge whose position corresponds to the shortest wavelength for light to be passed by said slit and having a second edge whose position corresponds to the longest wavelength for light to be passed by said slit; and (d) a second concave diffraction grating positioned to receive said once diffracted light from said slit and configured to provide an image in the form of a twice diffracted light output, said first concave spectrographic diffraction grating being oriented to disperse the components in a first direction on a focal surface as a function of wavelength, the directions of the dispersed once diffracted light substantially defining a plane, said second concave diffraction grating being oriented to disperse the components of said once diffracted light as twice diffracted light and to cause said twice diffracted light to travel along paths which are not parallel to said plane.

* * * * *